US007552007B2

(12) United States Patent
Dudek

(10) Patent No.: US 7,552,007 B2
(45) Date of Patent: Jun. 23, 2009

(54) CALIBRATION SYSTEMS AND METHODS FOR SCHEDULED LINEAR CONTROL ALGORITHMS IN INTERNAL COMBUSTION ENGINE CONTROL SYSTEMS USING GENETIC ALGORITHMS, PENALTY FUNCTIONS, WEIGHTING, AND EMBEDDING

(75) Inventor: Kenneth P. Dudek, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/021,529

(22) Filed: Jan. 29, 2008

(65) Prior Publication Data

US 2009/0070022 A1 Mar. 12, 2009

Related U.S. Application Data

(60) Provisional application No. 60/971,074, filed on Sep. 10, 2007.

(51) Int. Cl.
*G06F 19/00* (2006.01)

(52) U.S. Cl. ....................... 701/115; 701/111; 701/114; 73/114.31

(58) Field of Classification Search ................. 701/101, 701/103, 104, 107, 110–115; 123/478, 480; 73/114, 31, 114.52, 114.53
See application file for complete search history.

(56) References Cited

U.S. PATENT DOCUMENTS

| | | | | |
|---|---|---|---|---|
| 6,304,812 | B1 * | 10/2001 | Kolmanovsky et al. | 701/103 |
| 6,330,877 | B1 * | 12/2001 | Nordin | 123/480 |
| 7,204,236 | B2 * | 4/2007 | Ma et al. | 123/491 |
| 7,212,915 | B2 | 5/2007 | Dudek | |
| 7,236,876 | B2 * | 6/2007 | Sarlashkar et al. | 701/114 |
| 7,246,004 | B2 | 7/2007 | Dudek | |
| 7,302,937 | B2 * | 12/2007 | Ma et al. | 123/491 |
| 7,480,559 | B2 * | 1/2009 | Groer | 701/114 |

* cited by examiner

*Primary Examiner*—Stephen K. Cronin
*Assistant Examiner*—Johnny H. Hoang

(57) ABSTRACT

A method for calibrating an engine control system includes identifying engine calibration sub-problems for an engine calibration; seeding an initial generation for one of the engine calibration sub-problems with known/good individuals; optimizing free parameters in the one of the engine calibration sub-problem over a parameter/coefficient scheduling space using a genetic algorithm; using penalty functions; identifying a next one of the engine calibration sub-problems containing a prior one of the engine calibration sub-problems; seeding an initial population of the next one of the engine calibration sub-problems with know/good individuals; repeating until the engine calibration containing the engine calibration sub-problems is solved; and operating an engine control system of a vehicle using the engine calibration.

3 Claims, 2 Drawing Sheets

Figure 1:
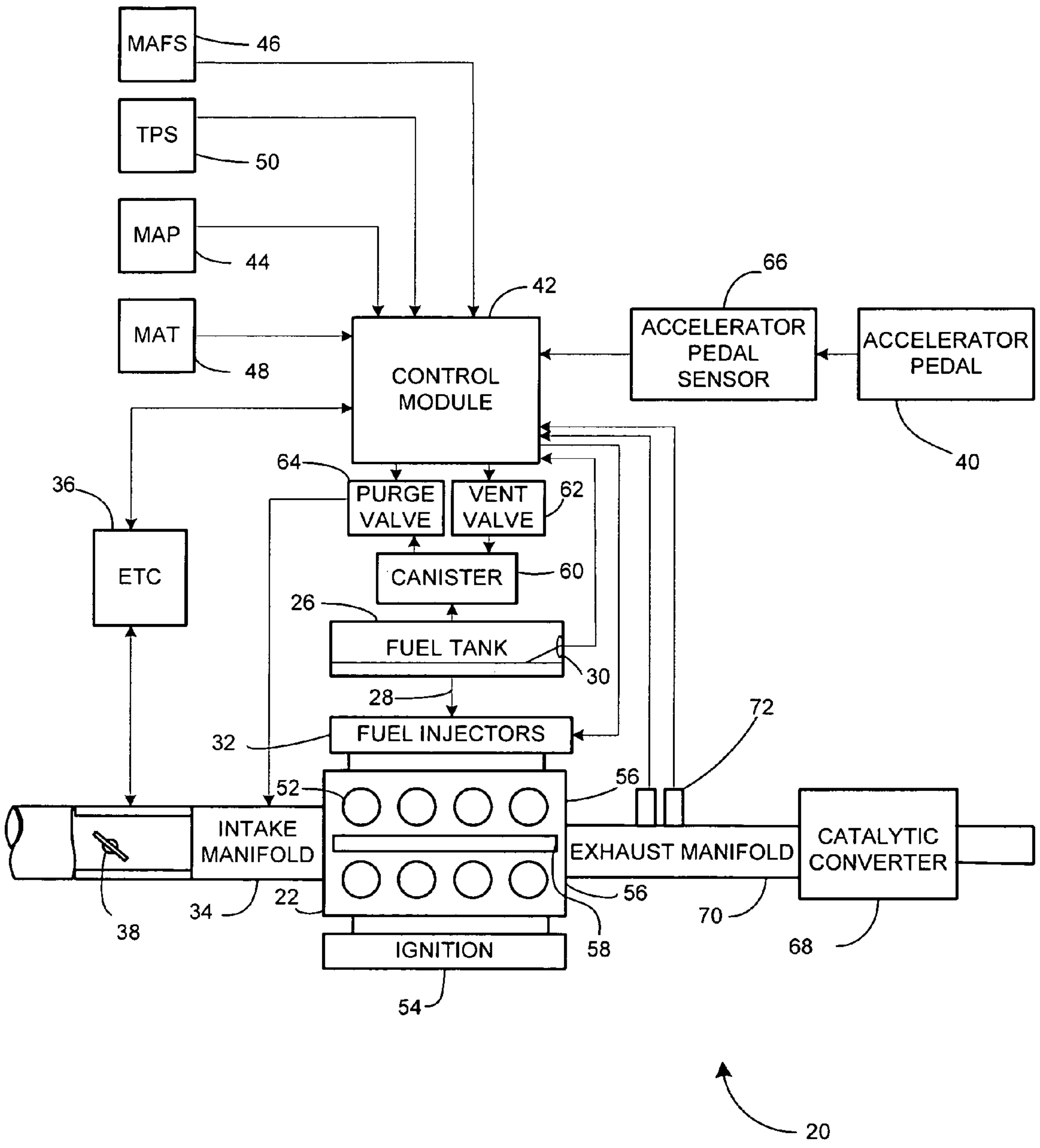

CALIBRATION SYSTEMS AND METHODS FOR SCHEDULED LINEAR CONTROL ALGORITHMS IN INTERNAL COMBUSTION ENGINE CONTROL SYSTEMS USING GENETIC ALGORITHMS, PENALTY FUNCTIONS, WEIGHTING, AND EMBEDDING

CROSS-REFERENCE TO RELATED APPLICATIONS

This application claims the benefit of U.S. Provisional Application No. 60/971,074, filed on Sep. 10, 2007. The disclosure of the above application is incorporated herein by reference in its entirety.

FIELD

The present disclosure relates to engine control systems for vehicles, and more particularly calibration of engine control systems for vehicles.

BACKGROUND

The statements in this section merely provide background information related to the present disclosure and may not constitute prior art.

Vehicle manufacturers typically use dynamic compensation in internal combustion engine (ICE) control systems. Examples include cylinder air rate prediction, fuel dynamics compensation, idle speed control, and closed-loop fuel control. Some manufacturers use control systems that are derived from scheduled, linear models of the process under control or feature scheduled, linear models in their implementation. For example, see Dudek et al., U.S. Pat. No. 7,248,004, "Nonlinear Fuel Dynamics Control with Lost Fuel Compensation".

Analytical methods that derive control systems from models usually require calibrated models. Calibrated models may be personalized to the particular product using the control system. There are a variety of methods for calibrating these kinds of models. Most methods involve some form of optimization. For example see, Dudek, U.S. Pat. No, 7,212,915,; "Application of Linear Splines to Internal Combustion Engine Control", which uses Least Squares. Alternatively, any other multivariable optimization method can be used.

SUMMARY

A method for calibrating an engine control system comprises identifying engine calibration sub-problems for an engine calibration; seeding an initial generation for one of the engine calibration sub-problems with known/good individuals; optimizing free parameters in the one of the engine calibration sub-problem over a parameter/coefficient scheduling space using a genetic algorithm; using penalty functions; identifying a next one of the engine calibration sub-problems containing a prior one of the engine calibration sub-problems; seeding an initial population of the next one of the engine calibration sub-problems with know/good individuals; repeating until the engine calibration containing the engine calibration sub-problems is solved; and operating an engine control system of a vehicle using the engine calibration.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
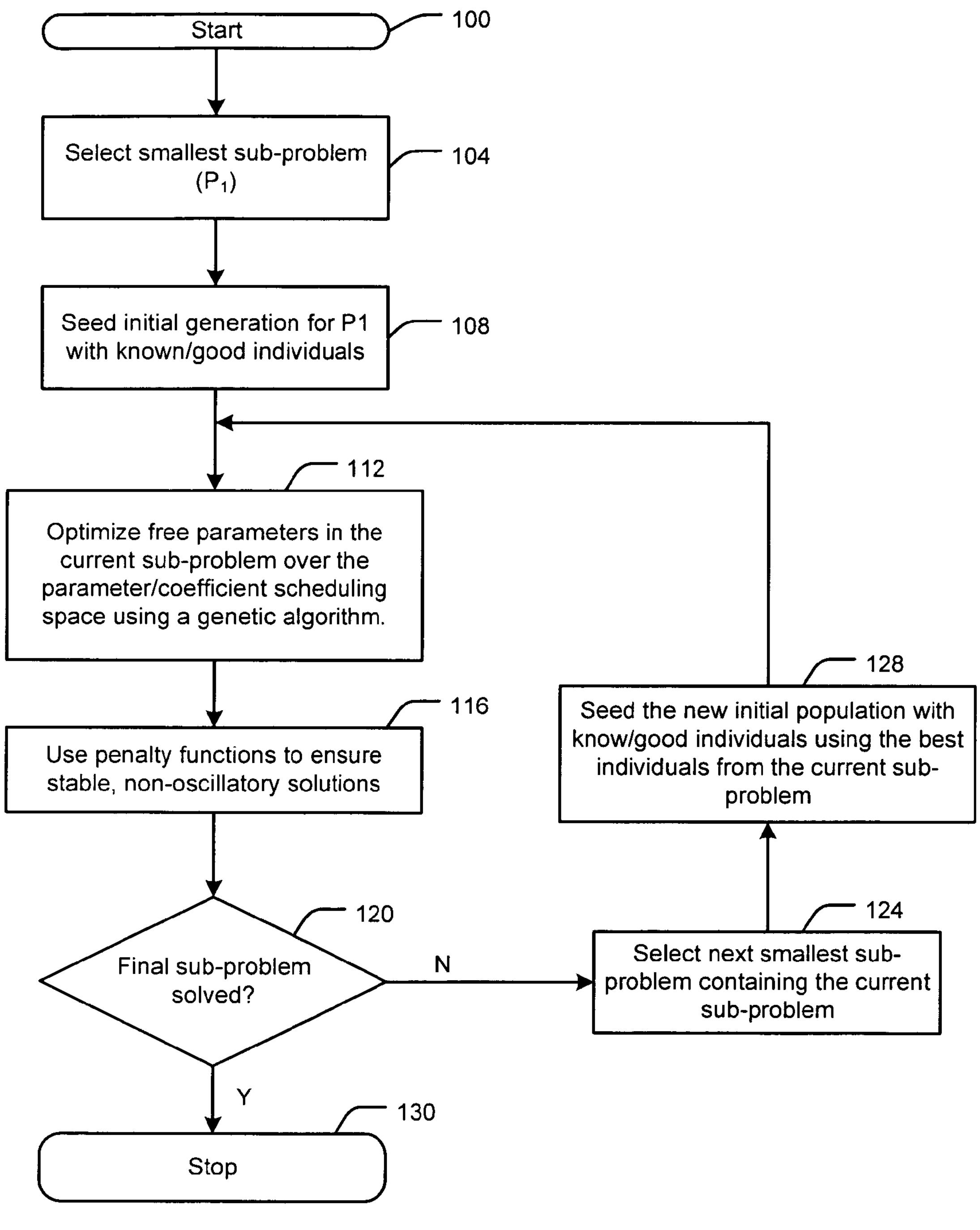

FIG. 1 is a functional block diagram of an exemplary vehicle engine control system; and FIG. 2 is a flowchart Illustrating the steps of a method for calibrating a vehicle using this invention.

DETAILED DESCRIPTION

The following description is merely exemplary in nature and is not intended to limit the present disclosure, application, or uses, it should be understood that throughout the drawings, corresponding reference numerals indicate like or corresponding parts and features. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The present disclosure relates to systems and methods for calibrating scheduled, linear models and control systems, which are increasingly being used for internal combustion engine (ICE) control systems. Most optimization methods lend themselves to embedding methods described in the present disclosure. Some standard methods, such as regression via least squares, are incapable of ensuring that the models (and their inverses) are stable and non-oscillatory. The primary benefit of least squares is the efficient numerical methods for calculating solutions.

Other methods, like multivariate optimization and similar gradient search methods can be used, together with properly chosen penalty functions to ensure stability and non-oscillatory behavior. However, these methods can easily get stuck on local optima and fall to find the best solutions. These methods are also sensitive to a starting point, so starting fairly near the optimal solution may be desirable.

Even when it is possible to start near the optimum solution, the additional of one or more penalty functions can make the cost function ill-behaved and cause the gradient search method to fail. In the example set forth below, prior attempts using gradient search methods failed for this reason.

Genetic algorithms (GA's) work well for smaller problems with few parameters because GA's can discover the optimal solution even when there is no initial guess. In these circumstances, the standard procedure is to have the GA start with an initial population selected randomly from all possible solutions. Moreover, because GA's rarely get stuck on local minima (for small problems with few parameters), GA's often converge to the true, optimal solution if they have had sufficient time.

With higher order problems, these desirable features break down. In particular, it is necessary to employ extra steps presented herein to reduce the problem size and to provide some individuals in the initial population that are good enough to at least satisfy the constraints imposed by the penalty functions.

The present disclosure interleaves optimization problems with small and large numbers of parameters to find nearly optimal solutions for increasingly larger sub-problems. Because the method seeds the initial population of each sub-problem with the solution of the preceding sub-problem, the method ensures that the GA does not spend an inordinate (possibly infinite) amount of time searching for a set of individuals that reasonably meet the additional criteria imposed by the penalty functions.

More particularly, the present disclosure employs the following techniques: (1) embedding methods, (2) seeding the initial population with some good individuals (from the preceding problem in the sequence of optimization problems), (3) use of penalty functions to ensure stability of forward and inverse models; and (4) use of penalty functions to ensure non-oscillatory control.

The present disclosure proposes using an optimization scheme featuring genetic algorithms (GA's), cost functions that balance model (algorithm) performance, weighting, penalty functions, and/or embedding.

GA's help ensure that the optimizations do not get stuck on local minima, even when the cost functions are ill-behaved (as they often are when multiple penalty functions are used). Specially chosen cost functions ensure that model (algorithm) performance is balanced over all operating regions. Weighting adjusts model or control performance in critical regions. Penalty functions ensure that the models and control algorithms calibrated in this manner meet the additional requirements (beyond mere optimality) necessary for use in typical internal engine control algorithms. Embedding overcomes the shortcomings of GA's when solving problems with large number of parameters and rigorous constraints (as captured in the penalty functions).

GA's are optimization schemes that mimic biological properties of evolution: selection, inheritance, and variation. In GA's, an individual is a set of parameters that characterize a potential solution to the problem at hand. To start the process, an initial population of individuals (i.e., sets of parameters that are potential solutions) is created and evaluated. Next, pairs of individuals in the population are allowed to "breed," producing offspring that contain elements of the parameters from both parents.

The probability that an individual is allowed to breed is a function of the individual's fitness. The more fit an individual is (i.e., the better the solution the parameters achieve), the higher the probability that the individual will be chosen to breed (and pass on some part of his parameters). After a new population of offspring is created, its individuals are evaluated, and bred to produce a new generation of offspring per the foregoing description. The process stops when the fittest individual in the population is good enough or no further improvements in fitness from generation to generation are apparent.

The standard references on GA's suggest starting with a completely random initial population. This approach, however, is ineffective for the highly constrained problems considered here. In fact, it appears to be necessary to "seed" the initial population with a few "good" individuals that satisfy the constraints penalized by the penalty functions discussed in the sequel.

Penalty Functions

In order for scheduled linear models and control algorithms to be useful in ICE control systems, the models and control algorithms should be stable. In some cases, it may be desirable for models to have stable inverses. For example only, a fuel dynamics model should have a stable inverse because the inverse is the fuel dynamics control. Moreover, it may be necessary for either the model or its inverse to be non-oscillatory.

In order to ensure these additional attributes (stability, non-oscillation), calibrators usually augment the cost function with a series of penalty functions that penalize violation of the desired attributes. To that end, a standard formulation would cast the calibration problem as an optimization problem wherein the calibrator is to find the set of model parameters that minimizes some cost function, C. To limit solutions to those that are stable, augment the cost function with a penalty term, Ci=Ki*I, where Ki is a gain and I is a measure of instability (of either the forward or/and the inverse model).

Now the calibration (optimization) problem is to find the set of model parameters that minimizes C+Ci. Similarly, if non-oscillatory behavior is required, the disclosure proposes to add a penalty function to penalize oscillatory behavior. If O is a measure of oscillatory behavior, and Co=Ko*Q is a cost function that penalizes oscillatory behavior, then the calibration problem is to find the set of model parameters that minimizes C+Co. If both stability and non-oscillatory behavior are required, minimize C+Ci+Co.

Exemplary Cost Function

Consider a scheduled linear model of an engine process to be controlled:

$$y_{mod}(k)=\alpha_1\times y(k-1)+\alpha_2\times y(k-2)+\ldots+\alpha_n\times y(k-n)+\beta_0\times u(k)+\beta_1\times u(k-1)+\beta_2\times u(k-2)+\ldots+\beta_m\times u(k-m) \quad (1)$$

where the $\alpha_i$ and $\beta_j$ are functions of engine operating condition. When the $\alpha_i$ and $\beta_j$ are linear spline functions of multiple variables, $V_a, V_b, \ldots, V_s$, with knots, $K_{a,i}, K_{b,i}, \ldots, K_{s,i}$, then the hyper-rectangular regions formed by the knots:

$$\text{Zone}_m=\{K_{a,i}\leqq V_a\leqq K_{a,i+1}\}\cup\{K_{b,j}\leqq V_b\leqq K_{b,j+1}\}\cup\ldots\cup\{K_{s,1}\leqq V_s\leqq K_{s,i+1}\} \quad (2)$$

are called "zones." In order to balance model (or control algorithm) performance over all operating regions, use a cost function that is based on instantaneous percent error (i.e., the percent error at each point) and accurate statistics over each "zone" (2). Let, $$e(k)=(y_{mod}(k)-y_{act}(k))/y_{act}(k),\ E_m(k)=\text{avg}(e(k))\forall k\in\text{Zone}_m,\text{ and } S_m(k)=std(e(k))\forall k\in\text{Zone}_m.$$

Here, $y_{mod}(k)$ is the model (1) evaluated at time k and $y_{act}(k)$ is the actual signal being modeled at time k. Define a local cost for each zone, m, $$C_m=\text{avg}(|E_m(k)|)+\text{avg}(S_m(k)) \quad (3)$$

Then, a cost function that balances model accuracy over all the different zones is:

$$C=\sum_{m=1}^{n} C_m \quad (4)$$

Here, C is the cost function and n is the total number of zones. Often times, the zones are chosen to isolate different operating behavior for the model under construction. Moreover, zones so chosen often segregate by the average size of the signal being modeled. In these cases, the cost function (4) has the added benefit of balancing model accuracy over small and large signals so that neither unduly influences model parameter choice.

Weighting

Many times model or control performance is more critical in certain zones. In this case, zone costs in the cost function (4) can be used to enhance model or control performance in the critical zones. For this circumstance, the cost function becomes:

$$C = \sum_{m=1}^{n} W_m \times C_m \tag{5}$$

where $W_m$ is the weighting for zone m.

Stability Penalty Functions

If the true engine behavior that is being modeled is stable, it is desirable that the model (1) be stable as well. At any single point in the operating region, one can define a transfer function for the model (1) and examine its poles. The poles of (1) are the roots of the polynomial:

$$N(z)=z^n-\alpha_1 \times z^{n-1}-\alpha_2 \times z^{n-2}- \dots -\alpha_n \tag{6}$$

where the $\alpha_i$ are constants (evaluated at a single operating point). A sufficient condition for the stability of (1) is that the modulus of each of the poles of (1) is less than unity for each point in the operating region. Because the roots of a polynomial are a continuous function of the polynomial's coefficients, one measure of the stability of (1) is to examine the poles of (1) at a sufficient number of points over the expected operating region. Moreover, like the cost function, one can define a penalty function that penalizes instability over a zone by evaluating the roots of the polynomial N(z) for points in the zone. Let $$p\max_m = \max_{k \in Zone_m} (\|r\|) \text{ s.t. } N(r) = 0,$$

be the maximum modulus of any root of N(z) over a zone, m, and define $$Cp_m^i = \begin{cases} 0 & \text{if } p\max_m \le thresh \\ e^{(pmax_m - thresh)} - 1 & \text{otherwise.} \end{cases} \tag{7}$$

A typical value of thresh is 0.985. Then, a cost function that penalizes unstable models is:

$$C = \sum_{m=1}^{n} (C_m + Cp_m^i). \tag{8}$$

Notice that the penalty function (7) is zero when the maximum modulus of a pole anywhere in the zone is less than the threshold. The penalty increases very quickly when this is not the case. Applying the penalty on a zone by zone basis allows the optimization to violate the stability constraint (mildly) in some zones while in pursuit of the optimum set of coefficients.

If stability of the inverse model is required, treat the zeros of the transfer function for the model (1) is a fashion analogous to the poles. The zeros of (1) are the roots of the polynomial:

$$D(z)=z^n-\beta_1 \times z^{m-1}-\beta_2 \times z^{m-2}- \dots -\beta_m \tag{9}$$

where the $\beta_i$ are constants (evaluated at a single operating point). A sufficient condition for the stability of the inverse of (1) is that the modulus of each of the zeros of (1) is less than unity for each point in the operating region. Because the roots of a polynomial are a continuous function of the polynomial's coefficients, one measure of the stability of (1) is to examine the zeros of (1) at a sufficient number of points over the expected operating region. Moreover, like the cost function, one can define a penalty function that penalizes instability of the inverse over a zone by evaluating the roots of the polynomial D(z) for points in the zone. Let:

$$z\max_m = \max_{k \in Zone_m} (\|r\|) \text{s.t.} D(r) = 0,$$

be the maximum modulus of any root of D(z) over a zone, m, and define $$Cz_m^i = \begin{cases} 0 & \text{if } z\max_m \le \text{thresh} \\ e^{(zmax_m - thresh)} - 1 & \text{otherwise} \end{cases}. \tag{10}$$

A typical value of thresh is 0.985. Then, a cost function that penalizes unstable inverse models is:

$$C = \sum_{m=1}^{n} (C_m + Cz_m^i). \tag{11}$$

Of course, if both stable models and stable inverses are required, then the cost functions (8) and (11) can be combined. Note, that it is precisely the case with fuel dynamics models, which model a process that is inherently stable, and which require stable inverses because the control is the inverse of the forward model. For this case, the cost function becomes:

$$C = \sum_{m=1}^{n} (C_m + Cp_m^i + Cz_m^i). \tag{12}$$

Oscillation Penalty Functions

In some circumstances, models or controls that are non-oscillatory are required. Fuel dynamics compensation, for example, requires that the inverse of the fuel dynamics model (which is the control) be non-oscillatory. This can be handled in a fashion similar to the stability requirement by construction of an appropriate penalty function.

For models, oscillatory behavior can be detected by examining the impulse or step response of the model (1) with the coefficients evaluated at various operating conditions within a zone, in a manner similar to the stability penalty function described above. Similarly, for inverse models, the impulse or step response of the inverse of model (1) can be used to construct a penalty function. To that end, let pulse(k) be the response of model (1) at time k to a unit Impulse at time 0. By definition, $$\text{pulse}(0) = \beta_0$$
$$\text{pulse}(1) = \alpha_1 \times \text{pulse}(0) + \beta_1$$
$$\text{pulse}(2) = \alpha_1 \times \text{pulse}(1) + \alpha_0 \times \text{pulse}(0) + \beta_2$$
$$\vdots$$

Let, $$(pulse\max)_m = \max_{Zone_m}(0, \text{pulse}(1) - \text{pulse}(0), \text{pulse}(2) - \text{pulse}(1), \ldots, \text{pulse}(j) - \text{pulse}(j-1))$$

then, a cost function that penalizes oscillation in the model (1) over a zone based on the impulse response could be:

$$Cp_m^o = \begin{cases} 0 & \text{if } (pulse\max)_m \le \text{thresh} \\ pulse\max_m - \text{thresh} & \text{otherwise} \end{cases}. \quad (13)$$

A typical value of thresh is 0.05. With these definitions, a cost function that penalizes oscillatory models is:

$$C = \sum_{m=1}^{n} (C_m + Cp_m^o). \quad (14)$$

Clearly, the penalty function (13) can also be included with any of the other penalty functions described above to penalize other undesirable behaviors as well.

It is possible to force other features as well. For example, in fuel dynamics compensation, it is desirable for the inverse model to be critically damped. In addition to being stable and non-oscillatory. For this situation, a penalty function on the step response of the inverse model can be used. Let step(k) be the response of the inverse of model (1) at time k to a unit step at time 0. By definition, $$\text{step}(0) = 1/\beta_0$$
$$\text{step}(1) = (1/\beta_0) \times (1 - \alpha_1 - \beta_1 \times \text{step}(0))$$
$$\text{step}(2) = (1/\beta_0) \times (1 - \alpha_1 - \alpha_2 - \beta_1 \times \text{step}(1) - \beta_2 \times \text{step}(0))$$
$$\vdots$$

Let, $$(step\max)_m = \max_{Zone_m}(0, \text{step}(1) - \text{step}(0), \text{step}(2) - \text{step}(1), \ldots, \text{step}(j) - \text{step}(j-1)),$$

then, a cost function that penalizes non-critically damped behavior and oscillation in the inverse of model (1) over a zone is:

$$Cs_m^o = \begin{cases} 0 & \text{if } (step\max)_m \le \text{thresh} \\ (step\max)_m - \text{thresh} & \text{otherwise} \end{cases}. \quad (15)$$

As before, a typical value of thresh is 0.05. With these definitions, a cost function that penalizes non-critically damped and oscillatory inverse models is:

$$C = \sum_{m=1}^{n} (C_m + Cs_m^o). \quad (16)$$

Clearly, the penalty function (15) can also be included with any of the other penalty functions described above to penalize other undesirable behaviors as well.

Embedding

Finally, the disclosure proposes calibrating the scheduled, linear models and control algorithms by solving a series of optimization problems, each one embedded in the next. The optimization sub-problems have three elements: (1) parameter space; (2) coefficient scheduling space; and (3) a set of "good" individuals that can be used to "seed" the initial population (for the genetic optimization).

Each of the sub-problems is embedded in its sequel in the sense that: (1) a sub-problem's parameter and/or coefficient scheduling space is contained in the parameter and/or coefficient scheduling space of its sequel, and (2) a sub-problem's solution is used to create the "seed" individuals for the initial population used to optimize its sequel. To that end, let $P=\{P_t|P_1 \subset P_2 \subset \ldots \subset P_n\}$ be a set of these sub-problems with their associated parameter/coefficient scheduling spaces and "seed" individuals for their respective initial populations.

An exemplary vehicle engine control system is shown in FIG. 1. The vehicle engine control system may need to be calibrated. Then, the proposed, embedding solution to the optimization problem is shown by a flowchart in FIG. 2, which is described below.

Referring now to FIG. 1, a vehicle 20 is shown. Fuel is delivered to an engine 22 from a fuel tank 26 through a fuel line 28 and through a plurality of fuel injectors 32. A fuel sensor 30 senses a level of fuel in the tank 26 and communicates the fuel level to a control module 42. Air is delivered to the engine 22 through an intake manifold 34.

An electronic throttle controller (ETC) 38 adjusts a throttle plate 38 that is located adjacent to an inlet of the intake manifold 34 based upon a position of an accelerator pedal 40 and a throttle control algorithm that is executed by the control module 42. In controlling operation of the vehicle 20, the control module 42 may use a sensor signal 44 indicating pressure in the intake manifold 34. The control module 42 also may use a sensor signal 46 indicating mass air flow entering the intake manifold 34 past the throttle plate 38, a signal 48 indicating air temperature in the intake manifold 34, and a throttle position sensor signal 50 indicating an amount of opening of the throttle plate 38. Still other sensors may be used.

The engine 22 includes a plurality of cylinders 52 arranged in one or more cylinder banks 58. The cylinders 52 receive fuel from the fuel injectors 32 where it undergoes combustion in order to drive a crankshaft 58. Vapor from the fuel tank 26 can be collected in a charcoal storage canister 60. The canister 60 may be vented to air through a vent valve 82. The canister 60 may be purged through a purge valve 64. When vapor is purged from the canister 60, it is delivered to the intake manifold 34 and burned in the engine cylinders 52. The control module 42 controls operation of the vent valve 62, purge valve 64, fuel injectors 32 and ignition system 54. The control module 42 also is connected with an accelerator pedal sensor 86 that senses a position of the accelerator pedal 40 and sends a signal representative of the pedal position to the control module 42.

A catalytic converter 68 receives exhaust from the engine 22 through an exhaust manifold 70. Each of a pair of exhaust sensors 72, e.g., oxygen sensors, is associated with a corresponding cylinder bank 56. The oxygen sensors 72 sense exhaust in the manifold 70 and deliver signals to the control module 42 indicative of whether the exhaust is lean or rich. The signal output of the oxygen sensors 72 is used by the control module 42 as feedback in a closed-loop manner to regulate fuel delivery to each cylinder bank 56, e.g., via fuel Injectors 32. It should be noted that configurations of the present disclosure are also contemplated for use in relation to vehicles having a single bank of cylinders and/or a single exhaust manifold oxygen sensor.

In some implementations, the sensors 72 are switch-type oxygen sensors as known in the art. The control module 42 may use the sensor 72 feedback to drive an actual air-fuel ratio to a desired value, usually around a stoichiometric value which may vary depending upon concentrations of ethanol and gasoline. A plurality of predefined engine operating regions are referred to by the control module 42 in controlling fuel delivery to the engine 22. Operating regions may be defined, for example, based on speed and/or load of the engine 22. The control module 42 may perform control functions that vary dependent on which operating region of the vehicle is currently active. Fuel, air and/or re-circulated exhaust to the engine 22 may be adjusted, i.e., trimmed, to correct for deviations from a desired air-fuel ratio. As can be appreciated, various other vehicle engine control systems may be used.

Referring now to FIG. 2, the method begins with step 100 and proceeds to step 104 where the smallest sub-problem $P_1$ is selected. In step 108, an initial generation for sub-problem $P_1$ is seeded with known/good individuals. In step 112, free parameters in the current sub-problem are optimized over the parameter/coefficient scheduling space using a genetic algorithm. In step 118, penalty functions are used to ensure stable, non-oscillatory solutions. In step 120, a determination is made as to whether the final sub-problem is solved. In other words, are the parameter/coefficient scheduling spaces covered? If step 120 is false, the method continues with step 124 and a next smallest sub-problem containing the current sub-problem is selected. In step 128, an new initial population is seeded with know/good individuals using the best individuals from the current sub-problem. When step 120 is true, the method stops.

EXAMPLE EMBODIMENT

Calibrating Fuel Dynamics Compensation

Oftentimes, the coefficients in the required models are scheduled as functions of physical variables that characterize engine operating condition. For example, the Fuel Dynamics Compensator (FDC), which uses the linear part of the nonlinear compensator detailed by Dudek, et al., in U.S. Pat. No. 7,246,004, "Nonlinear Fuel Dynamics Control with Lost Fuel Compensation," (which is incorporated herein by reference in its entirety) uses the inverse of a nominal fuel dynamics model whose coefficients are scheduled a function of MAP, RPM, temperature, and ethanol concentration.

It is an example of the type of control algorithm that can be calibrated using the methods of this disclosure. In FDC, the coefficient scheduling functions are linear splines as described by Dudek in U.S. Pat. No. 7,212,915, "Application of Linear Splines to Internal Combustion Engine Control" (which is incorporated herein by reference in its entirety). The temperature used in the coefficient schedules can be engine coolant temperature (ECT) and/or intake valve temperature (IVT).

In order to calibrate FDC, the engineer calibrates the nominal fuel dynamics model, which explains the behavior of measured, burned fuel mass (as inferred from F/A measurements taken in the exhaust port of an internal combustion engine) in response to commanded fuel mass. The equations for the linear part of the nominal fuel dynamics model and compensator are:

Model $$F_M(k) = \alpha_1 \times F_M(k-1) + \alpha_2 \times F_M(k-2) + \alpha_3 \times F_M(k-3) + \alpha_4 \times F_C(k) + \alpha_5 \times F_C(k-1) - \alpha_6 \times F_C(k-2) + \alpha_7 \times F_C(k-3)$$

Compensator $$F_C(k) = \left( \begin{array}{c} F_R(k) - \alpha_1 \times F_R(k-1) - \alpha_2 \times F_R(k-2) - \\ \alpha_3 \times F_R(k-3) - \alpha_5 \times F_C(k-1) - \\ \alpha_6 \times F_C(k-2) - \alpha_7 \times F_C(k-3) \end{array} \right) \Big/ \alpha_4$$

Here, $F_M(k)$ is the measured, burned fuel mass that results from fuel injected on engine cycle k, $F_C(k)$ is the compensated fuel mass on engine cycle k, and $F_R(k)$ is the requested (burned) fuel mass on engine cycle k. The model (and compensator) coefficients, $\alpha_1$, are linear spline functions of MAP, RPM, ECT, and ETH:

$$\alpha_r = a_r + \sum_{i=1}^{n} b_{ri} \times UMAP(i) + \sum_{i=1}^{m} c_{rj} \times URPM(j) + \sum_{j=1}^{m} d_{rj} \times MAP \times URPM(j) + \sum_{i=1}^{n} e_{ri} \times RPM \times UMAP(i) + \sum_{i=1}^{k} w_{ri} \times UECT(l) + \sum_{j=1}^{l} x_{rj} \times UETH(j) + \sum_{j=1}^{l} y_{rj} \times ECT \times UETH(j) + \sum_{i=1}^{k} z_{ri} \times ETH \times UECT(i)$$

where $$UMAP(i) = \begin{cases} 0 & \text{if } MAP \le MAP_i \\ MAP - MAP_i & \text{otherwise} \end{cases},$$

$$URPM(j) = \begin{cases} 0 & \text{if } RPM \le RPM_j \\ RPM - RPM_j & \text{otherwise} \end{cases},$$

$$UECT(k) = \begin{cases} 0 & \text{if } ECT \le ECT_k \\ ECT - ECT_k & \text{otherwise} \end{cases},$$

and $$UETH(l) = \begin{cases} 0 & \text{if } ETH \le ETH_l \\ ETH - ETH_l & \text{otherwise} \end{cases}.$$

Note that there will be a separate set of $a_i$'s, $b_{ij}$'s, $c_{ij}$'s, $d_{ij}$'s, $e_{ij}$'s, $w_{ij}$'s, $x_{ij}$'s, $y_{ij}$'s, and $z_{ij}$'s for each of the $\alpha_i$'s. Further note that FDC is required to be unit gain. The easiest way to achieve this is to require that $\alpha_7=1=(\alpha_1+\alpha_2+\alpha_3+\alpha_4+\alpha_5+\alpha_6)$. The parameter, $\alpha_7$, therefore, is no longer independent.

The functions, UMAP(i), URPM(j), UECT(k), and UETH (l), are called "basis functions," and the constants, $MAP_i$, $RPM_j$, $ECT_k$, and $ETH_l$, are called "knots." Typical values for $MAP_i$ are: 15, 30, 45, 80, 75, and 90 (kPa). Typical values of $RPM_j$ are 500, 1300, 2100, 2900, 3700, and 4500 (RPM). Typical values for $ECT_k$ are 245, 265, 285, 305, 325, and 345 (deg k). Typical values of $ETH_l$ are 0, 20, 40, and 60 (% ethanol). Note that with these knot choices, there are 270 free parameters (1 constant+(2*6÷2*6=24) MAP/RPM terms+(2*6÷2*4=20) EOT/ETH terms)*6 coefficients ($\alpha_7$, is calculated from the other $\alpha_i$'s).

Calibration Problem

The calibration problem is to find the $a_i$'s, $b_{ij}$'s, $c_{ij}$'s, $d_{ij}$'s, $e_{ij}$'s, $w_{ij}$'s, $x_{ij}$'s, $y_{ij}$'s, and $z_{ij}$'s so that the nominal fuel dynamics model minimizes the cost function:

$$C = \sum_{m=1}^{n} (C_m + Cp_m^i + Cz_m^i + Cs_m^o),$$

where the components of the cost function are according to Equations (3) (or (5) if weighting is used), (7), (10), and (15) above. Note that the error defined in (3) (or (5)) is the difference between $F_M(k)$ and actual, measured burned fuel appropriately shifted to account for transport delay.

By construction of the cost function (with the penalty terms), it is clear that the optimization seeks a solution that: (1) matches the test data well; (2) is stable; (3) has an inverse that is stable (note: the control is the inverse); and (4) has an inverse that generates non-oscillatory and critically damped control responses to typical inputs.

Solution

Let $\Re$ be the set of real numbers and $q_{ij}^{*p}$ be the optimal solution for a parameter, $q_{ij}$, when optimized over $S_p$. Define the family of nested sub-problems (with their associated parameter/coefficient scheduling spaces) and solve via the prescriptions of FIG. 1:

Define $P_1$:

$$\min_{a_i, b_{ij}, \ldots \in S_1} C \text{ where } S_1 = \{a_i \in \Re,\ b_{ij}, c_{ij}, d_{ij}, e_{ij}, w_{ij}, x_{ij}, y_{ij}, z_{ij} = 0,\ ECT \le ECT_1,\ ETH = 0\}$$

$P_1$ finds the best set of constants over the first temperature range, with ethanol concentration set to zero, that still meet the stability and non-oscillatory constraints. Seed the initial population with a few individuals where $a_1=0.8$, $a_4=0.25$, $a_5=-0.05$, $a_2=a_3=a_6=0$.

Define $P_2$:

$$\min_{a_i, b_{ij}, \ldots, \in S_2} C \text{ where } S_2 = \{a_i, w_{i1} \in \Re, b_{ij}, c_{ij}, d_{ij}, e_{ij}, w_{i(j\neq 1)}, x_{ij}, y_{ij}, z_{ij} = 0,\ ECT \le ECT_1,\ ETH = 0\}$$

$P_2$ finds the best set of constants and temperature coefficients over the same region as $P_1$. Seed the initial population with a few individuals with the constants (the $a_i$'s) equal to the solution of $P_1$ and the temperature coefficients equal to 0.

Define $P_3$:

$$\min_{a_i, b_{ij}, \ldots, \in S_3} C \text{ where } S_3 = \{a_i, w_{i1}, b_{ij}, c_{ij}, d_{ij}, e_{ij} \in \Re,\ w_{i(j\neq 1)}, x_{ij}, y_{ij}, z_{ij} = 0,\ ECT \le ECT_1,\ ETH = 0\}$$

$P_3$ finds the best constants, temperature coefficients, MAP coefficients, RPM coefficients, and MAP*RPM coefficients over the same region as $P_1$, seeding the initial population with the optimal results from $P_2$. Set the MAP coefficients, RPM coefficients, and MAP*RPM coefficients to 0 for the seed individuals.

Define $P_4$:

$$\min_{a_i, b_{ij}, \ldots, \in S_4} C \text{ where } S_4 = \{a_i, w_{i1}, w_{i2} \in \Re,\ b_{ij} = b_{ij}^{*3}, c_{ij} = c_{ij}^{*3}, d_{ij} = d_{ij}^{*3}, e_{ij} = e_{ij}^{*3}, w_{i(j\neq 1,2)}, x_{ij}, y_{ij}, z_{ij} = 0,\ ECT \le ECT_2,\ ETH = 0\}$$

$P_4$ finds the best constants and temperature coefficients over the first and second temperature ranges, with ethanol concentration set to zero, holding the MAP, RPM, and MAP*RPM coefficients at the optimal values from $P_3$ and seeding the initial population with the optimal constants and temperature coefficients from $P_3$. For the seed individuals, set the temperature coefficients corresponding to the second temperature range equal to the negative of the temperature coefficients from the first temperature range (so the sum of the temperature coefficients equals 0).

Define $P_5$:

$$\min_{a_i, b_{ij}, \ldots, \in S_5} C \text{ where } S_5 = \{a_i, w_{i1}, w_{i2}, b_{ij}, c_{ij}, d_{ij}, e_{ij} \in \Re,\ w_{(i\neq 1,2)j}, x_{ij}, y_{ij}, z_{ij} = 0,\ ECT \le ECT_2,\ ETH = 0\}$$

$P_5$ finds the best constants, temperature coefficients, MAP coefficients, RPM coefficients, and MAP*RPM coefficients over the same region as $P_4$, seeding the initial population with the optimal results from $P_4$.

Define $P_6$:

$$\min_{a_i, b_{ij}, \ldots, \in S_6} C \text{ where } S_6 = \{a_i, w_{i1}, w_{i2}, w_{i3} \in \Re,\ b_{ij} = b_{ij}^{*5}, c_{ij} = c_{ij}^{*5}, d_{ij} = d_{ij}^{*5}, e_{ij} = e_{ij}^{*5}, w_{i(j\neq 1,2,3)}, x_{ij}, y_{ij}, z_{ij} = 0,\ ECT \le ECT_3,\ ETH = 0\}$$

$P_6$ finds the best constants and temperature coefficients over the first, second and third temperature ranges, with ethanol concentration set to zero, holding the MAP, RPM, and MAP*RPM coefficients at the optimal values from $P_5$ and seeding the initial population with the optimal constants and temperature coefficients from $P_5$. For the seed individuals, set the temperature coefficients corresponding to the third temperature range equal to the negative of the sum of the temperature coefficients from the first and second temperature ranges (so the sum of the temperature coefficients equals 0).

Define $P_7$:

$$\min_{a_i,b_{ij},\ldots,\in S_7} C \text{ where } S_7=\{a_i, w_{i1}, w_{i2}, w_{i3}, b_{ij}, c_{ij}, d_{ij}, e_{ij}\in\Re, w_{i(j\neq 1,2,3)}, x_{ij}, y_{ij}, z_{ij}=0, ECT\le ECT_3, ETH=0\}$$

$P_7$ finds the best constants, temperature coefficients, MAP coefficients, RPM coefficients, and MAP*RPM coefficients over the same region as $P_6$, seeding the initial population with the optimal results from $P_6$.

Define $P_8$:

$$\min_{a_i,b_{ij},\ldots,\in S_8} C \text{ where } S_8=\{a_i, w_{i1}, w_{i2}, w_{i3}, w_{i4}\in\Re, b_{ij}=b^{*7}_{ij}, c_{ij}=c^{*7}_{ij}, d_{ij}=d^{*7}_{ij}, e_{ij}=e^{*7}_{ij}, w_{i(j\neq 1,2,3,4)}, x_{ij}, y_{ij}, z_{ij}=0, ECT\le ECT_4, ETH=0\}$$

$P_8$ finds the best constants and temperature coefficients over the first, second, third, and fourth temperature ranges, with ethanol concentration set to zero, holding the MAP, RPM, and MAP*RPM coefficients at the optimal values from $P_7$ and seeding the initial population with the optimal constants and temperature coefficients from $P_7$. For the seed individuals, set the temperature coefficients corresponding to the fourth temperature range equal to the negative of the sum of the temperature coefficients from the first, second, and third temperature ranges (so the sum of the temperature coefficients equals 0).

Define $P_9$:

$$\min_{a_i,b_{ij},\ldots,\in S_9} C \text{ where } S_9=\{a_i, w_{i1}, w_{i2}, w_{i3}, w_{i4}, b_{ij}, c_{ij}, d_{ij}, e_{ij}\in\Re, w_{i(j\neq 1,2,3,4)}, x_{ij}, y_{ij}, z_{ij}=0, ECT\le ECT_4, ETH=0\}$$

$P_9$ finds the best constants, temperature coefficients, MAP coefficients, RPM coefficients, and MAP*RPM coefficients over the same region as $P_8$, seeding the initial population with the optimal results from $P_8$.

Define $P_{10}$:

$$\min_{a_i,b_{ij},\ldots,\in S_{10}} C \text{ where } S_{10}=\{a_i, w_{i1}, w_{i2}, w_{i3}, w_{i4}, w_{i5}\in\Re, b_{ij}=b^{*9}_{ij}, c_{ij}=c^{*9}_{ij}, d_{ij}=d^{*9}_{ij}, e_{ij}=e^{*9}_{ij}, w_{i6}, x_{ij}, y_{ij}, z_{ij}=0, ECT\le ECT_5, ETH=0\}$$

$P_{10}$ finds the best constants and temperature coefficients over the first second, third, fourth, and fifth temperature ranges, with ethanol concentration set to zero, holding the MAP, RPM, and MAP*RPM coefficients at the optimal values from $P_9$ and seeding the initial population with the optimal constants and temperature coefficients from $P_9$. For the seed individuals, set the temperature coefficients corresponding to the fifth temperature range equal to the negative of the sum of the temperature coefficients from the first, second, third, and fourth temperature ranges (so the sum of the temperature coefficients equals 0).

Define $P_{11}$:

$$\min_{a_i,b_{ij},\ldots,\in S_{11}} C \text{ where } S_{11}=\{a_i, w_{i1}, w_{i2}, w_{i3}, w_{i4}, w_{i5}, b_{ij}, c_{ij}, d_{ij}, e_{ij}\in\Re, w_{i6}, x_{ij}, y_{ij}, z_{ij}=0, ECT\le ECT_5, ETH=0\}$$

$P_{11}$ finds the best constants, temperature coefficients, MAP coefficients, RPM coefficients, and MAP*RPM coefficients over the same region as $P_{10}$, seeding the as population with the optimal results from $P_{10}$.

Define $P_{12}$:

$$\min_{a_i,b_{ij},\ldots,\in S_{12}} C \text{ where } S_{12}=\{a_i, w_{ji}\in\Re, b_{ij}=b^{*11}_{ij}, c_{ij}=c^{*11}_{ij}, d_{ij}=d^{*11}_{ij}, e_{ij}=e^{*11}_{ij}, x_{ij}, y_{ij}, z_{ij}=0, ETH=0\}$$

$P_{12}$ finds the best constants and temperature coefficients over all temperature ranges, with ethanol concentration set to zero, holding the MAP, RPM, and MAP*RPM coefficients at the optimal values from $P_{11}$ and seeding the initial population with the optimal constants and temperature coefficients from $P_{11}$. For the seed individuals, set the temperature coefficients corresponding to the last temperature range equal to the negative of the sum of the temperature coefficients from the other temperature ranges (so the sum of the temperature coefficients equals 0).

Define $P_{13}$:

$$\min_{a_i,b_{ij},\ldots,\in S_{13}} C \text{ where } S_{13}=\{a_i, w_{ij}, b_{ij}, c_{ij}, d_{ij}, e_{ij}\in\Re, x_{ij}, y_{ij}, z_{ij}=0, ETH=0\}$$

$P_{13}$ finds the best constants, temperature coefficients, MAP coefficients, RPM coefficients, and MAP*RPM coefficients over the same region as $P_{12}$, seeding the initial population with the optimal results from $P_{12}$.

Define $P_{14}$:

$$\min_{a_i,b_{ij},\ldots,\in S_{14}} C \text{ where } S_{14}=\{a_i, w_{ij}, x_{ij}, y_{ij}, z_{ij}\in\Re, b_{ij}=b^{*13}_{ij}, c_{ij}=c^{*13}_{ij}, d_{ij}=d^{*13}_{ij}, e_{ij}=e^{*13}_{ij}\}$$

$P_{14}$ finds the best constants, temperature coefficients, ethanol coefficients, and ethanol*temperature over the entire operating range, holding the MAP, RPM, and MAP*RPM coefficients at the optimal values from $P_{13}$ and seeding the initial population with the optimal constants and temperature coefficients from $P_{13}$. For the seed individuals, set the ethanol and ethanol*temperature coefficients to 0.

Define $P_{15}$:

$$\min_{a_i,b_{ij},\ldots,\in S_{15}} C \text{ where } S_{15}=\{a_i, w_{ij}, b_{ij}, c_{ij}, d_{ij}, e_{ij}, x_{ij}, y_{ij}, z_{ij}\in\Re\}$$

$P_{15}$ finds the best constants, temperature coefficients, MAP coefficients, RPM coefficients, MAP*RPM coefficients, ethanol coefficients, and ethanol*temperature coefficients over the same region as $P_{14}$, seedling the initial population with the optimal results from $P_{14}$.

Other subdivisions are possible. In particular, the sub-problems $P_{14}$ and $P_{15}$ might be further subdivided. Alternatively, one could start with $P_1$ and go directly to $P_4$ or $P_6$, using the constants from $P_1$ and setting all temperature coefficients to 0.

The benefits include more accurate control, decreased calibration effort, and less reliance on calibrator skill. More accurate control can lead to reduced system cost because it allows for reduced catalyst loadings while still meeting emission standards. Decreased calibration effort reduces fixed system cost, as does the reduced reliance on calibrator skill.

What is claimed is:

1. A method for calibrating an engine control system, comprising:

a) identifying engine calibration sub-problems for an engine calibration;

b) seeding an initial generation for one of the engine calibration sub-problems with known/good individuals;

c) optimizing free parameters in the one of the engine calibration sub-problems over a parameter/coefficient scheduling space using a genetic algorithm;

d) using penalty functions;

e) identifying a next one of the engine calibration sub-problems containing a prior one of the engine calibration sub-problems;

f) seeding an initial population of the next one of the engine calibration sub-problems with known/good individuals;

g) repeating steps c), d), e) and f) until the engine calibration containing the engine calibration sub-problems is solved; and h) operating an engine control system of a vehicle using the engine calibration.

2. The method of claim 1 wherein the penalty functions are used to ensure a stable, non-oscillatory solution to said engine calibration sub-problems.

3. The method of claim 2 further comprising using weighting to control performance.

* * * * *